United States Patent [19]

Scobbo, Jr. et al.

[11] Patent Number: 5,177,146

[45] Date of Patent: Jan. 5, 1993

[54] COMMINGLED HOUSEHOLD PLASTIC SCRAP PROCESSING AND MODIFICATION

[75] Inventors: James J. Scobbo, Jr.; Michael P. Laughner, both of Clifton Park; Timothy J. Shea, Schenectady, all of N.Y.

[73] Assignee: General Electric Company, Schenectady, N.Y.

[21] Appl. No.: 694,579

[22] Filed: May 2, 1991

[51] Int. Cl.$^5$ ............................ C08G 63/91; C08J 7/12
[52] U.S. Cl. ......................................... 525/74; 524/504
[58] Field of Search ............................ 525/74; 524/504

[56] References Cited

FOREIGN PATENT DOCUMENTS 57967   8/1982   European Pat. Off. .
334420  9/1989   European Pat. Off. .

Primary Examiner—Nathan M. Nutter
Assistant Examiner—Jeffrey C. Mullis
Attorney, Agent, or Firm—William H. Pittman

[57] ABSTRACT

A composition prepared by blending both consumer-used household plastic resins with an ortho ester grafted copolymer derived from components comprising ethylene and a $C_{3-10}$ mono-olefin is disclosed. The plastic resins comprise at least 50 percent polyethylene.

18 Claims, No Drawings

COMMINGLED HOUSEHOLD PLASTIC SCRAP PROCESSING AND MODIFICATION

This invention relates to a method for recycling commingled polymer resins that have been formed into shaped articles and used by consumers; and more particularly to compositions of improved mechanical properties prepared by blending these recycled resins and an ortho ester grafted copolymer (hereinafter rubber) derived from components comprising ethylene and a $C_{3-10}$ mono-olefin.

Countless pounds of plastic bottles, containers, and other household items are being sold to consumers every day. This results in hundreds of millions of pounds of polyethylene, polypropylene, polystyrene, polyvinyl chloride, polyester, and other non biodegradable thermoplastic and some thermoset resin scrap that must be disposed of each year. For environmental reasons, it would be highly desirable to find additional uses for this large and ever growing amount of this household waste, such as recycling the scrap resin into useful products. For consumer convenience and compliance with recycling programs as well as economic and environmental reasons, it would be desirable to find ways to process the commingled household scrap without sorting.

A method for recycling plastic objects without any pre-selection or separation is known in the art. It involves fine grinding of the unseparated thermoplastic and some thermoset scrap followed by drying and then mixing to form a homogeneous mass. Binding agents such as olefin polymers may be then added followed by low temperature melting and mixing. Ultimately, shaped articles may be formed from this recycled blend.

However, this blend does not possess optimum mechanical properties which are desirable when using the recycled plastic resin. Therefore, the present invention provides a composition prepared from the commingled plastic resin scrap, capable of being molded into shaped articles which exhibit a great improvement in mechanical performance over articles made from recycled plastic resin not prepared by the methods of this invention.

Accordingly, in one of its aspects the present invention provides a composition prepared by blending under reactive conditions reclaimed unsorted consumer-used thermoplastic material comprising at least about 50% polyethylene with an ortho ester grafted copolymer derived from components comprising ethylene and a $C_{3-10}$ mono-olefin, preferably EP (ethylene propylene) or ethylene $C_{3-10}$ mono-olefin diene terpolymer rubber. Preferably reactive conditions under which the composition is prepared include precompounding finely ground plastic waste resin particles and then blending the product with the functionalized rubber. This modified blend can be subsequently molded into shaped articles which exhibit improved mechanical properties over blends which do not contain the ortho ester grafted copolymer. The composition of the present invention may optionally comprise up to about 40 percent by weight of filler material or thermoset resins. Suitable filler material includes particulate or fibrous reinforcing agents.

Preferably the commingled plastic resins, which may be incompatible, are ground to powder. The powder is then extruded and pelletized. The extruded and pelletized powder is then melt blended with the ortho ester grafted copolymer. The above mentioned melt blending operation may be performed in conventional melt blending apparatus of both the batch and continuous type. It is often preferably conducted continuously in an extruder, by reason of the excellent properties of extruded material and the availability of extruders in commercial polymer processing facilities. Typical conditions include temperatures in the range of about 120°–460° C. The proportion, by weight, of the consumer-used material to the rubber is about 99:1 to 1:99, and most often about 95:5 to 70:30.

Rubbers which can be used in the practice of the present invention can be made by a well known procedure, as fully described in patents such as, U.S. Pat. Nos. 2,933,480, 3,093,621, 3,211,709, 3,646,168, 3,790,519, 3,884,993, 3,894,999 and 4,059,654 which are incorporated herein by reference. A typical procedure for making olefinic impact modifiers such as ethylene $C_{3-10}$ mono-olefin diene terpolymer is by reacting varying amounts of ethylene, $C_{3-10}$ mono-olefin, and a non-conjugated polyene monomer containing a plurality of carbon to carbon double bonds which is carried out in the presence of a catalyst and a solvent medium. Suitable polyene monomers include such polyene monomers as, open chained polyunsaturated hydrocarbons containing 4–20 carbon atoms, such as 1,4-hexadiene, monocyclic polyenes and polycyclic polyenes. The polyunsaturated bridged ring hydrocarbons or halogenated bridged ring hydrocarbons are preferred. Examples of such bridged ring hydrocarbons include the polyunsaturated derivatives of bicyclo(2,2,1) heptane, wherein at least one double bond is present in one of the bridged rings, such as dicyclopentadiene, bicyclo(2,2,1)hepta-2,5-diene, the alkylidene norbornenes, and especially the 5-alkylidene-2-norbornenes wherein the alkylidene group contains 1–20 carbon atoms and preferably 1–8 carbon atoms, the alkenyl norbornenes, and especially the 5-alkylidene-2-norbornenes, wherein the alkylidene group contains 3–20 carbon atoms and preferably 3–10 carbon atoms. Other bridged ring hydrocarbons include polyunsaturated derivatives of bicyclo(2,2,2)octane as represented by bicyclo(3,2,1) octane polyunsaturated derivatives of bicyclo(3,3,1 nonane and polyunsaturated derivatives of bicyclo(3,2,2)nonane.

Specific examples of preferred bridged ring compounds include 5-methyldene-2-norbornene, 5-ethylidene-2-norbornene, 5-n-propylidene-2-norbornene, 5-isobutylidene-2-norbornene, 5-n-butylidene-2-norbornene, 5-isobutylidene-2-norbornene, dicyclopentadines, the methyl butenyl norbornenes such as 5-(2-methyl-2-butenyl)-2-norbornene or 5-(3-methyl-2-butenyl)-norbornene, and 5-(3-dimethyl-4-hexenyl)-2-norbornene. The elastomer prepared from 5-ethylidene-2-norbornene is preferred.

The ethylene $C_{3-10}$ mono-olefin diene terpolymer backbone rubber may contain chemically bound molar ratios of ethylene to propylene or other

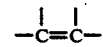

mono-olefins, varying between 95 to 5, and 5 to 95 ethylene to propylene, and preferably between about 83 parts by weight ethylene, 12 parts by weight propylene, and 5 parts by weight ethylidene norbornene. The other suitable $C_{3-10}$ mono-olefins include but are not limited to 1-butene, 2-butene, 1-pentene, 2-pentene, 1-hexene, 2-hexene, 3-hexene, 1-heptene, 2-heptene, 3-heptene, 1-octene, 2-octene, 3-octene, 4-octene, 1-nonene, 2-nonene, 3-nonene, 4-nonene, 1-decene, 2-decene, 3-decene, 4-decene, 5-decene. The polyene or substituted polyene may be chemically bound therein in an amount of 0.1 to 10 mol percent, and preferably 0.3 to 1 mol percent. The level of unsaturation in the backbone rubber may range from 0–20 double bonds, per 1,000 carbon atoms in the polymer chain.

Ethylenically unsaturated ortho esters suitable for use in the present invention include those of the formula

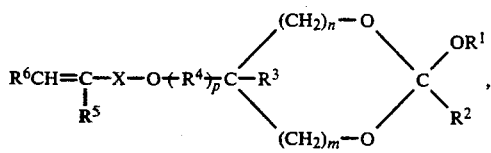

wherein:

each of $R^1$ and $R^2$ is $C_{1-10}$ primary or secondary alkyl or aralkyl or a $C_{6-10}$ aromatic radical;

$R^3$ is hydrogen or $C_{1-4}$ primary of secondary alkyl;

$R^4$ is an unsubstituted or substituted $C_{1-6}$ alkylene or $C_{6-10}$ arylene radical;

$R^5$ is hydrogen or methyl;

$R^6$ is hydrogen, $C_{1-6}$ alkyl or a a $C_{6-10}$ aromatic radical;

X is a substantially inert linking group;

m is 0 or 1;

n is from 1 to 2-m; and p is 0 or 1.

The $R^1$ value herein may be a $C_{1-10}$ primary or secondary alkyl radical such as methyl, ethyl, n-propyl, isopropyl, n-butyl, isobutyl, secondary butyl, n-hexyl, isooctyl or n-decyl, or a corresponding aralkyl radical. Most often, it is $C_{1-4}$ alkyl. Primary radicals and especially the methyl radical are generally preferred.

The $R^2$ value may be a $C_{1-4}$ primary of secondary alkyl radical as defined above for $R^1$, or a $C_{6-10}$ unsubstituted or substituted aromatic (preferably aromatic hydrocarbon) radical. Any substituents should be non-reactive under the conditions of the invention; examples are halo, nitro and alkoxy.

The $R^3$ value may be hydrogen or an alkyl radical similar to $R^1$ and $R^2$. It is preferably hydrogen.

The $R^4$ is an unsubstituted or substituted $C_{1-6}$ alkylene radical, any substituents being inert to ortho ester formation and reaction with aryl chlorides; e.g., alkoxy. Preferably, $R^4$ is methylene.

The $R^6$ radical may be hydrogen, alkyl or aryl as previously defined. It is preferably hydrogen.

The X value may be any linking group which is substantially inert under the conditions of formation and polymerization of the cyclic ortho esters. Those skilled in the art will understand that a wide variety of groups fit this description, and the ortho ester used in this invention is not limited in that respect.

Suitable X groups include unsubstituted and substituted divalent aliphatic, alicyclic and aromatic radicals and combinations thereof, any substituents being of the type previously described. The radicals may be attached to other divalent radicals such as carbonyl, sulfone, carbamoyl, disubstituted silicon and alkyl- and arylphosphoryl. The preferred X groups have the formulas

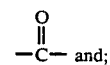

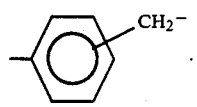

The cyclic ortho esters used in this invention include acrylic and methacrylic acid esters, wherein X has formula II, as well as vinylbenzyl ethers, wherein X has formula III. Both vinyl ($R^5$ is hydrogen) and isopropenyl ($R^5$ is methyl) compounds are included; for example, acrylic and methacrylic acid esters. For the most part, $R^5$ is preferably hydrogen when X has formula III.

The values of m and n depend on whether the cyclic ortho ester moiety is a 5-membered or 6-membered ring. In general, 5-membered rings are preferred; that is, m is 0 and n is 1. However, the invention also includes compositions in which a 6-membered ring is present, which requires either than m and n both be 1 or that m be 0 and n be 2.

Also included are compounds in which p is 0; that is, compounds not containing an $R^4$ value. Most often, p will be 0 when the ortho ester ring is a 6-membered ring.

The ethylenically unsaturated cyclic ortho esters used in this invention may be prepared by the reaction of a hydroxy-substituted ortho ester of the formula

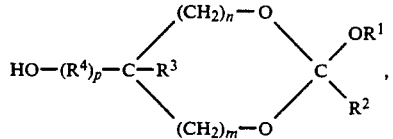

wherein $R^{1-4}$, m, n and p are as previously defined, with a suitable reagent such as acryloyl chloride, methacryloyl chloride or a vinylbenzyl chloride. Said reaction takes place under conventional conditions. In the case of acryloyl chloride or methacryloyl chloride, it typically occurs in the presence of a tertiary amine as acid acceptor and in solution in a relatively non-polar organic solvent. The hydroxy-substituted ortho ester and acryloyl or methyacryloyl chloride may be employed in approximately equimolar amounts, or the chloride may be employed in slight excess. The amine is generally present in excess, to ensure neutralization of all the acidic by-product formed.

Reaction between the hydroxy-substituted ortho ester and vinylbenzyl chloride is also conducted under conventional conditions, typically in the presence of an alkaline reagent such as sodium hydroxide. Again, the hydroxy-substituted ortho ester and vinylbenzyl chloride may be employed in roughly equimolar amounts, or, in this case, an excess of the ortho ester may be employed. The molar proportion of base is generally about equal to that of ortho ester. No solvent is generally necessary, although one may be employed if desired.

The scrap thermoplastic resin need not be sorted or separated, thus both compatible and non-compatible plastic resins may be used to form the composition of the present invention. However, for optimum mechanical properties in shaped articles formed from the recycled blend, the scrap thermoplastic resin must contain at least about 50% polyethylene. The composition of the present invention may optionally comprise up to about 40 percent by weight of filler material or thermoset resins. Suitable filler material includes particulate or fibrous reinforcing agents. It is believed that the ortho ester functionalized rubber is able to compatibilize an otherwise incompatible recycled plastic blend through both its miscibility with polyethylene and reactions of the ortho ester with blend components.

In order that those skilled in the art may be better able to practice the present invention, the following examples are given as illustrations of the superior mechanical characteristics of the present invention. It should be noted that the invention is not limited to the specific details embodied in the Examples and further that all parts are by weight.

EXAMPLE 1

A recycled composition was prepared by blending 90 parts scrap plastic resin (scrap) and 10 parts of an ortho ester functionalized EPDM (ethylene propylene diene monomer) rubber (F-EPDM).

The scrap plastic resin comprising at least about 50% polyethylene was pre-compounded as follows. Commingled household plastic scrap (washed, dried and granulated) obtained from Polymerland, Inc., was first ground to a powder a particle size of approximately 1-2 mm or less at room temperature. This powder was fed into a 400° F. Welding Engineers 20 mm twin screw extruder and pelletized. This blend was then dried at 85° C. for 3-4 hours before subsequent extrusions.

The ortho ester functionalized EPDM was prepared as follows. Mixtures of the ortho esters suitable for use in this invention (listed below in Table 1) and 2,5-dimethyl-2,5-di(t-butylperoxy)hexane were premixed and combined with 1 kilogram of a commercially available EPDM copolymer containing about 83 mole percent ethylene and about 5.4 mole percent norbornene units. The blends were stored for about 16 hours at 20° C. to enable the ortho ester and polymerization initiator to be completely absorbed by the EPDM pellets, and were then extruded on a twin-screw extruder with zone set temperatures ranging from 120° to 205° C. The extrudate was cooled in a water bath, pelletized and dried in a vacuum.

The proportion of the ethylenically unsaturated ortho ester grafted on the EPDM copolymer was determined by dissolving a sample of the graft copolymer in xyelne at about 130° C., pouring the resulting solution into acetone and filtering and drying the purified copolymer, which was then analyzed by Fourier transform infrared spectroscopy. Gel content was determined by continuous extraction with hot xylene for 48 hours followed by drying and weighing of the insoluble residue. The results are given in Table 1, with all percentages being by weight.

TABLE 1

|  | A | B | C | D | E |
|---|---|---|---|---|---|
| Ortho ester: | 1* | 1* | 1* | 2* | 3* |
| Percent based on EPDM copolymer | 0.3 | 1.0 | 3.0 | 1.0 | 1.3 |
| 2,5-dimethyl-2,5-di(t-butylperoxy)-hexane | 0.03 | 0.1 | 0.3 | 0.1 | 0.13 |
| Orthoester grafted, % | <90 | <90 | <90 | 50 | — |
| Gel, % | 0 | 40 | 40 | 0 | — |

*1 = 4-acryloyloxymethyl-2-methoxy-2-methyl-1,3-dioxolane
2 = 4-methacryloxymethyl-2-methoxy-2-methyl-1,3-dioxolane
3 = 4-acryloyloxymethyl-2-methoxy-2-phenyl-1,3-dioxolane The scrap plastic resin/functionalized EPDM blend was prepared as follows. The precompounded resin and functionalized EPDM were dry blended and compounded in the Welding Engineers Extruder as described for precompound preparation. The pelletized extrudate again was dried at 85° C. for 3-4 hours and injection molded into ASTM specimens for testing.

EXAMPLE 2

The procedure of Example 1 was repeated except that 80 parts of the scrap, described in Example 1, and 20 parts of the functionalized EPDM were blended.

Control 1

100 parts of scrap described in Example 1 was used.

Control 2

90 parts of scrap described in Example 1 and 10 parts of an unfunctionalized EPDM rubber were blended in a manner similar to the preparation of the blended compositions of Example 1.

Control 3

The procedure of Control 2 was repeated except that 80 parts of scrap, described in Example 1 and 20 parts of an unfunctionalized EPDM rubber were used.

Control 4

80 parts of scrap described in Example 1 and 20 parts of ethylene vinyl acetate (hereinafter EVA), commercially available as Elvax from E.I. Dupont, and DeNemours & Co. (Inc.) were blended in a manner similar to that described in Example 1.

Control 5

80 parts of scrap of Example 1 and 20 parts of a copolymer of polyethylene and glycidyl methacrylate commercially available as Bondfast E (BF-E) from Sumitomo Chemical Co. (Ltd.) were blended in a manner similar to that described in Example 1.

Control 6

80 parts of scrap of Example 1 and 20 parts of a terpolymer of polyethylene and glycidyl methacrylate and vinyl acetate, commercially available as Bondfast 2B (BF-2B) from Sumitomo Chemical Co. (Ltd.).

TABLE 1

| COMPOSITION | COMPOSITION PARTS BY WEIGHT | MODULUS (ksi) | MAX STRAIN AT BREAK (%) | NOTCHED IZOD (ft-lb/in) |
|---|---|---|---|---|
| Example 1 | Scrap/EPDM, 90/10 | 91 | 26 | 1.5 |
| Example 2 | Scrap/EPDM, 80/20 | 66 | 83 | 2.6 |
| Control 1 | Scrap, 100 | 120 | 13 | .8 |
| Control 2 | Scrap/EPDM, 90/10 | 96 | 13 | .6 |
| Control 3 | Scrap/EPDM, 80/20 | 72 | 35 | 1.2 |
| Control 4 | Scrap/EVA, 80/20 | 75 | 26 | 2.0 |
| Control 5 | Scrap/BF-E, 80/20 | 70 | 34 | 1.6 |
| Control 6 | Scrap/BF-2B, 80/20 | 75 | 31 | 1.4 |

Table 1 illustrates that a significant improvement in mechanical performance can be obtained when scrap plastic resin is blended with the functionalized EPDM rubber described in Examples 1 and 2 as opposed to blends of plastic scrap and non-functionalized EPDM or other functionalized rubbery additives.

Obviously, other modifications and variations of the present invention, are possible in light of the above teachings. It is therefore to be understood that changes may be made in particular embodiments of the invention described which are within the full intended scope of the invention as defined by the claims. It is to be understood further that all patents mentioned above are to be incorporated herein by reference.

What is claimed is:

1. A composition comprising a product obtained by blending under reactive conditions:
   a. reclaimed commingled thermoplastic resins comprising at least about 50 percent polyethylene, by weight of total resins; and
   b. an ortho ester grafted copolymer derived from components comprising ethylene and a $C_{3-10}$ mono-olefin.

2. A composition according to claim 1 wherein the ortho ester grafted copolymer is selected from the group consisting of ethylene $C_{3-10}$ mono-olefin copolymers and ethylene, $C_{3-10}$ mono-olefin, diene terpolymers.

3. A composition according to claim 2 wherein the ortho ester grafted copolymer is derived from a grafting monomer of the formula

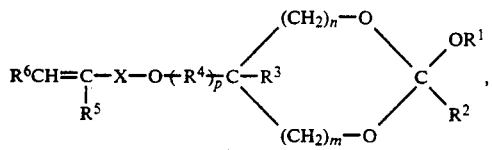

wherein:
each of $R^1$ and $R^2$ is $C_{1-10}$ primary or secondary alkyl or aralkyl or a $C_{6-10}$ aromatic radical;
$R^3$ is hydrogen or $C_{1-4}$ primary or secondary alkyl;
$R^4$ is an unsubstituted or substituted $C_{1-6}$ alkylene or $C_{6-10}$ arylene radical;
$R^5$ is hydrogen or methyl;
$R^6$ is hydrogen, $C_{1-6}$ alkyl or a $C_{6-10}$ aromatic radical;
X is a substantially inert linking group;
m is 0 or 1;
n is from 1 to 2-m; and
p is 0 or 1.

4. A composition according to claim 1 wherein the ortho ester is 4-acryloyloxymethyl-2-methoxy-2-methyl-1,3-dioxolane.

5. A composition according to claim 1 prepared by
   i. preblending reclaimed finely ground thermoplastic particles, and then
   ii. blending the product of step (i) with the ortho ester grafted polymer.

6. A composition according to claim 1 further comprising up to about 40 percent by weight of filler material or thermoset resins.

7. A composition according to claim 7 wherein the filler material comprises particulate or fibrous reinforcing agents.

8. A composition according to claim 1 wherein the ratio by weight of the reclaimed plastic resin to the ortho ester grafted copolymer is about 4:1.

9. A shaped article, fiber, or film comprising the composition of claim 1.

10. A process for recycling objects derived from reclaimed commingled thermoplastic resins comprising blending under reactive conditions the thermoplastic resins comprising at least about 50 percent polyethylene, and an ortho ester grafted copolymer derived from components comprising ethylene and a $C_{3-10}$ mono-olefin.

11. A composition according to claim 10 wherein the ortho ester grafted copolymer is selected from the group consisting of ethylene $C_{3-10}$ mono-olefin copolymers and ethylene, $C_{3-10}$ mono-olefin, diene terpolymers.

12. A process according to claim 10 wherein
   a. the commingled thermoplastic resins are ground to a powder;
   b. the product produced by step b is then melt blended with, the ortho ester grafted copolymer.

13. A process according to claim 10 wherein
   a. the commingled thermoplastic resins are ground to powder;
   b. the powder is extruded and pelletized; and then
   c. the product produced by step (b) is then melt blended with the ortho ester grafted copolymer.

14. A process according to claim 10 wherein the ratio by weight of the reclaimed thermoplastic resins to the ortho ester grafted copolymer is about 4:1.

15. A process according to claim 10 wherein the ortho ester grafted copolymer is derived from a grafting monomer of the formula

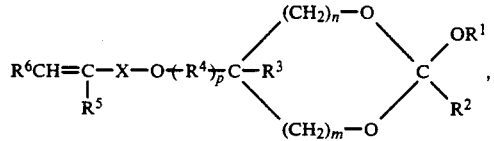

wherein:
each of $R^1$ and $R^2$ is $C_{1-10}$ primary or secondary alkyl or aralkyl or a $C_{6-10}$ aromatic radical;
$R^3$ is hydrogen or $C_{1-4}$ primary or secondary alkyl;
$R^4$ is an unsubstituted or substituted $C_{1-6}$ alkylene or $C_{6-10}$ arylene radical;
$R^5$ is hydrogen or methyl;
$R^6$ is hydrogen, $C_{1-6}$ alkyl or a $C_{6-10}$ aromatic radical;
X is a substantially inert linking group;
m is 0 or 1;
n is from 1 to 2-m; and
p is 0 or 1.

16. A process according to claim 13 wherein the ortho ester is 4-acryloyloxymethyl-2-methoxy-2-methyl-1,3-dioxolane.

17. A process according to claim 10 wherein the reactive conditions include melt blending.

18. A process according to claim 10 wherein the blending is accomplished by reactive extrusion.

* * * * *